2,750,394

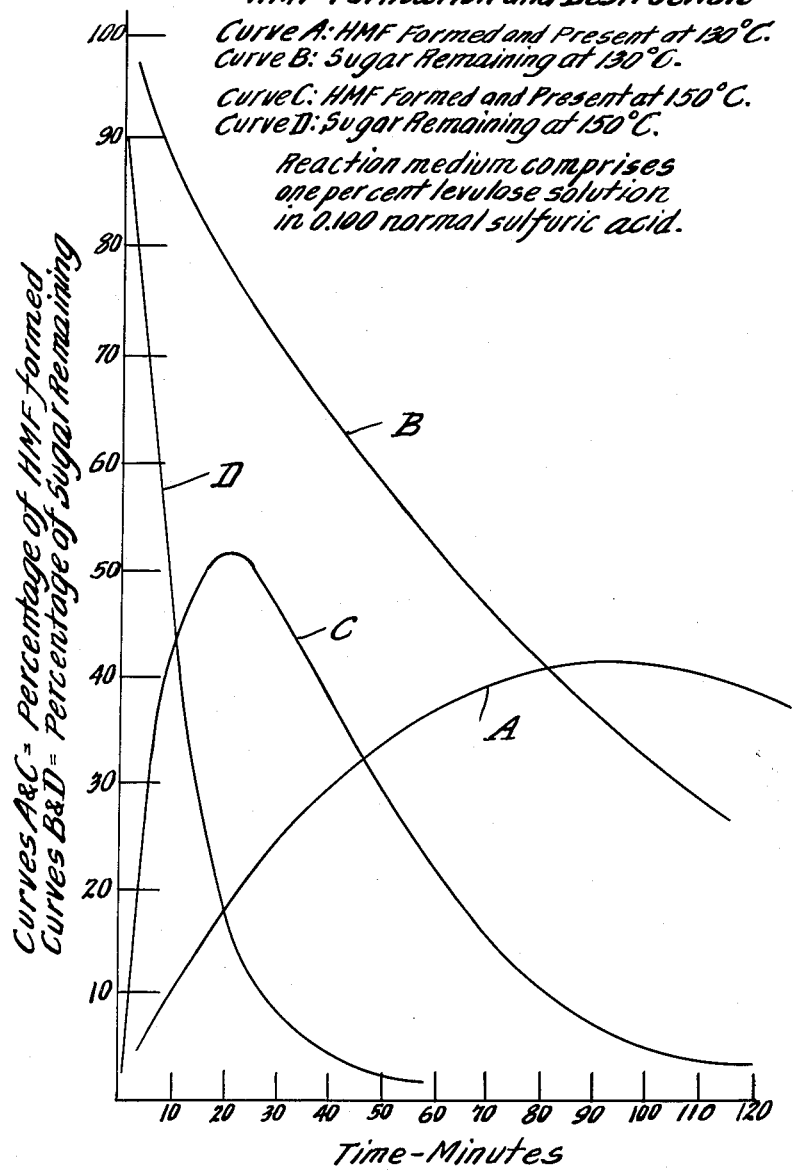

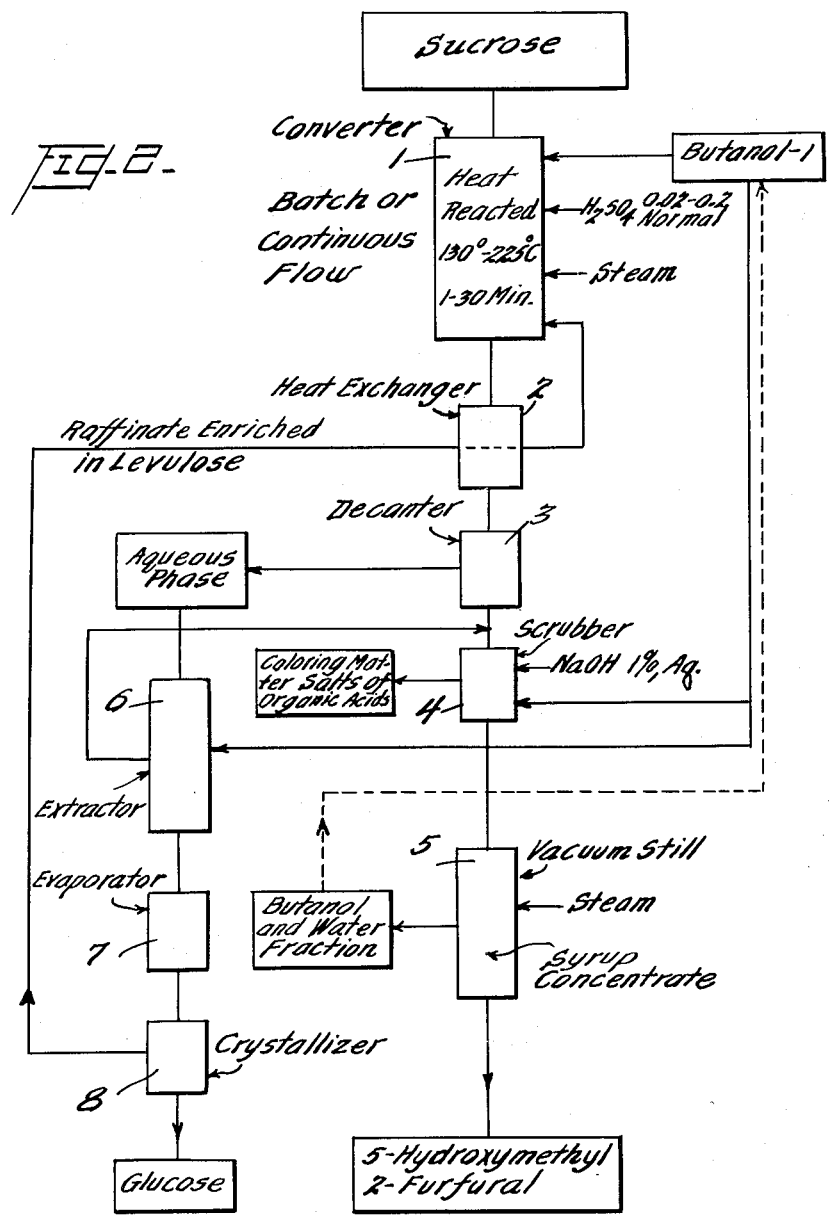

MANUFACTURE OF 5-HYDROXYMETHYL 2-FURFURAL

Quintin P. Peniston, Seattle, Wash., assignor to Food Chemical and Research Laboratories, Inc., Seattle, Wash., a corporation of Washington Application May 22, 1952, Serial No. 289,397

11 Claims. (Cl. 260—347.8)

The present invention relates to the manufacture of 5-hydroxymethyl 2-furfural, hereinafter designated HMF, from carbohydrate substances or mixtures containing keto-hexose sugars.

It is known to produce HMF by the dehydration of hexose sugars in an acid media at elevated temperatures, said HMF having been initially prepared in 1895 from levulose by Dull, Chem. Ztg., 19 216, and from sucrose by Kiermayer, Chem. Ztg., 19 1003. Since the work of Dull and Kiermayer over fifty years ago, many subsequent investigators have worked along the lines of Dull and Kiermayer, but have not succeeded in producing a practical method for the production of HMF.

It may be pointed out that due to the poor yields obtained by the prior art processes and the unsatisfactory nature of these processes, HMF has never become a starting material for chemical synthesis although it has many possibilities.

Using modifications of the Kiermayer process, Haworth; Jones and Wiggins, J. Chem. Soc., 1945, 1; Haworth and Jones, ibid. 1944, 667; and Montgomery and Wiggins, J. Soc. Chem. Ind. 66, 31 (1947), have studied the yields of HMF obtainable by various carbohydrate sources. These investigators have used different acid catalysts, varied conversion temperatures, and an inert atmosphere of hydrogen during the conversion process in an attempt to obtain increased yields of HMF. They ascertained that higher yields could be produced than had been produced by the processes of previous workers, and HMF could be formed from sucrose without the use of an added catalyst when higher temperatures were employed. The acidic substances formed from the sucrose under the conditions of conversion were sufficient to catalyze the HMF formation. Based on this work, Haworth and Wiggins obtained U. S. Patent No. 2,498,918, February 28, 1950, and British Patents No. 591,858 and No. 600,871. Haworth and his co-workers made no detailed study of the kinetics of HMF formation and its destruction when HMF is produced by dehydration of hexose sugars at an elevated temperature in an acid media.

A detailed study has been made of the kinetics of HMF formation and destruction, and it has been discovered how to produce high yields of this material, and this is the primary object of the present invention.

It is desired to point out that increased yields can be obtained if the HMF formation reaction velocity constant $k_1$ increases more rapidly with increasing temperature than the HMF destruction reaction velocity constant $k_2$ increases, and that the increase can be effected by conducting the reaction to produce HMF at higher temperatures than previously used, and preferably with shorter periods of reaction, and that this increase in yield can be obtained by having present during the conversion of the sugar into HMF an aliphatic alcohol, preferably although not necessarily, having 1 to 5 carbon atoms in its molecule. Both the high temperature and the use of an accelerator of HMF formation relative to HMF decomposition may be simultaneously employed to increase the yield.

In one form of the invention where HMF is produced in a linear operation in the presence of alcohol functioning as an accelerator of HMF formation, the alcohol may be one that is miscible with the water containing the sugar in solution as, for example, sucrose or levulose, at the temperature of conversion, such alcohol being typified by methanol or ethanol. However, in order to increase the yield of HMF it is desirable to employ a recycling process, and when doing so, it is preferable to use an alcohol which is miscible with water or the aqueous solution undergoing reaction at a reaction temperature used to convert the sugar to HMF, but not miscible at temperatures below the reaction temperature. For example, normal butanol is not miscible with water or the aqueous solution undergoing reaction at temperatures below 125° C. and, therefore, when the reaction medium contains butanol, the reaction can be carried out at temperatures above 125° C. as, for example, 130°, 140°, 150°, 160°, and 170° C. and up to about 200° C. or about 225° C. On cooling below 125° C. the reaction mixture separates into two phases, an alcohol rich phase, and an aqueous phase, and it is the latter which can be recycled as hereinafter set forth in detail.

The reaction may be carried out with or without an extraneously added catalyst, but it is preferable to use a catalyst. Any prior art catalyst, including acid catalysts, and acid-generating catalysts, may be employed. However, it is preferred to carry out the reaction in the presence of an acid catalyst including inorganic acids and organic acids or compounds generating during the reaction an inorganic or organic catalyst radical, subject to the limitation that the catalyst should be stable at the temperature at which the sugar solution is reacted to produce HMF. For example, oxalic acid cannot be used where the temperature of reaction exceeds 140° C. since it decomposes into formic acid and carbon dioxide, but it can be used if the temperature of reaction is below 140° C. The preferred catalysts are the strong mineral acids and particularly sulfuric acid.

The concentration of the catalyst in the reaction mixture and during the reaction whereby the sugar is converted into HMF has no significant effect on the yield of HMF. The velocity constants $k_1$ and $k_2$ are both increased by increased catalytic concentration but in the same ratio. Catalyst concentration can be considered as a simple, unique balance between the cost of the catalyst and the cost of heat and equipment. Higher catalyst concentration gives shorter reaction periods and greater through-put for the same apparatus. Therefore, it is preferred to have a catalyst present and desirably, although not necessarily, in a concentration in the reaction solution between the limits of about 0.2 normal and 0.02 normal.

In one form of the invention it is desirable to stop the reaction prior to obtaining maximum peak yield of HMF based on the amount of sugar originally present in the reaction medium, the yield of HMF in the present disclosure wherever it is referred to being expressed as moles of HMF per mole of ketohexose or equivalent sugar in the reaction medium. This yield may be termed "max.$^{sp}$" that is, the maximum yield based on the sugar present, the exponent "sp" being the first letters of "sugar" and "present."

The maximum yield may also be based on the sugar consumed and, of course, then the maximum yield is increased. However, the amount of HMF produced per unit of material processed will be reduced. For example, if the peak concentration of HMF in the aqueous reaction medium at 160° C. is 65% expressed as moles of HMF per mole of keto-hexose, which illustratively may be derived from sucrose, it is probably not economical to stop the reaction whereby the sugar is converted, as herein set forth, to HMF before at least 50% to 75% of this 65% yield is obtained, considering that the concentration of 65% HMF in the reaction medium is based on the sugar present therein. If the reaction is stopped when the yield is lower, the apparent yield may exceed the 65% HMF yield because more sugar will be left unconsumed, and the final yield, based on the sugar consumed, will be greater than the apparent maximum yield as will be hereinafter more particularly pointed out.

The present invention will be illustrated by the following examples:

EXAMPLE 1.—ONE STAGE CONVERSION OF LEVULOSE AT 170° C.

Levulose in the amount of 500 mg. was dissolved in 0.100 normal sulfuric acid, 25 ml. Aliquot portions of this solution (0.2132 ml. each) and 0.2132 ml. of normal butyl alcohol saturated with water were sealed in small glass tubes and heated in an oil bath at 170° C. for the following time periods: 2, 4, 6, 8, 10, 12 and 16 minutes. After conversion reaction the tubes were cooled rapidly in water, opened and the contents quantitatively transferred to volumetric flasks for dilution to an appropriate concentration for ultraviolet absorption analysis. Optical density of the solutions at 2840 A. (angstroms) was measured using 1.00 cm. quartz cells in a Bechmann Model DU ultraviolet spectrophotometer. The HMF content of each solution was calculated from the molar extinction coefficient of 16,700 reported by Singh, Dean and Cantor in J. A. C. S. 70, 517, 1948. It may be stated that ultraviolet analysis for determination of HMF has been recommended by Schou and Abildgaard, Z. Untersuch. Lebensm. 68, 502, 1934. This method of analysis for HMF is accurate for kinetic studies when humidification is not exessive. With strongly overconverted reaction products a correction factor must be applied for ultraviolet absorption by humic substances and levulinic acid. Ultra-violet measurements must be made soon after dilution of the samples since autooxidation of HMF to hydroxymethyl furoic acid proceeds rapidly in very dilute aqueous solutions. In the present experiments the ultraviolet method of analysis has been checked by oxidation of crude HMF extracts to hydroxymethyl furoic acid by the method of Reichstein, Helvetica Chimica Acta, 9, 1066, 1926, and there has been obtained yields of over ninety per cent based on the ultra-violet HMF analysis.

*Analytical data for Example 1*

| Conversion Time (min.) | Dilution for Analysis | Optical Density @ 2,840 A | HMF Yield, Percent of Theory |
|---|---|---|---|
| 2 | 0.4264/100 | 1.003 | 25.7 |
| 4 | 0.4264/200 | 1.115 | 56.4 |
| 6 | 0.4264/200 | 1.330 | 67.3 |
| 8 | 0.4264/250 | 1.074 | 68.0 |
| 10 | 0.4264/250 | 1.064 | 67.4 |
| 12 | 0.4264/200 | 1.295 | 65.6 |
| 16 | 0.4264/250 | 0.940 | 59.5 |

A maximum yield of 68.0% in eight minutes is indicated. From these values and Equations 2 and 3, hereinafter referred to, $k_1 = 0.2710$, $k_2 = 0.0506$.

Referring to the above table, the expression "dilution for analysis" indicates that the entire content of each tube amounting to 0.4264 ml. was diluted in water to the volume shown, namely, 100, 200, or 250 ml. This was done to bring the HMF concentration into suitable range for accurate measurement with the spectrophotometer. An optical density of 1.0 means that $1/10$ of the ultraviolet light to which the solution was exposed was transmitted, the other $9/10$ being absorbed by the HMF. Without dilution less than $1/1000$ of the light would be transmitted, and the instrument would not measure this small amount accurately.

EXAMPLE 2.—TWO STAGE CONVERSION OF SUCROSE

Sucrose in the amount of 10.0 grams was dissolved in 0.100 normal sulfuric acid, 50 ml. To this solution was added normal butyl alcohol saturated with water, 50 ml. The mixture was placed in a small stainless steel autoclave and heated in an oil bath at 150° C. for 20 minutes. The autoclave was cooled in water, opened and the phases separated. The alcohol was reddish-brown in color and the aqueous phase pale yellow. There was no solid material. The aqueous phase was extracted with 50 ml. of wet butanol and returned to the autoclave with another 50 ml. of wet butanol for a second conversion using the same time and temperature. After the second conversion the phases were again separated and the aqueous phase was again extracted with 50 ml. of wet butanol. Analytical results are shown in the following table.

*Analytical results for Example 2*

| Phase | Volume, ml. | HMF Found, grams | Yield, Percent of Theory |
|---|---|---|---|
| Butanol after 1st conversion | 50 | 1.230 | 33.4 |
| Extract from Aqueous Phase, 1st Conversion | 50 | 0.474 | 12.9 |
| Butanol after 2nd Conversion | 50 | 0.593 | 16.1 |
| Extract from Aqueous Phase, 2nd Conversion | 50 | 0.223 | 6.2 |
| Final Aqueous Residue | 50 | 0.143 | 3.9 |

Total HMF formed _____ percent __ 72.5
Total HMF recovered in butanol extracts _____ do ____ 68.6
Estimated sugar consumed _____ do ____ 86
Recovered Yield based on sugar consumed _____ do ____ 80.0

EXAMPLE 3.—TWO STAGE CONVERSION OF BLACK-STRAP MOLASSES

Crude black-strap molasses (71.5% dry substance, 47.9% total sugar) in the amount of 100 grams was diluted with 100 ml. of water and de-ashed by passage over a column of cation exchange resin. Effluent and washings to 250 ml. were collected. Fifty milliliters of this solution equivalent to 20 grams of original molasses was mixed with 50 ml. of wet butanol and converted in a stainless steel autoclave at 150° C. for 20 minutes. No catalyst other than the acids liberated by ash removal was used. Phase separation on cooling was not as rapid as with sucrose but was still satisfactory. The aqueous phase was extracted with 50 ml. of wet butanol and then again converted for 20 minutes at 150° C. with 50 ml. of added wet butanol. The phases were again separated and the aqueous phase again extracted with a 50 ml. portion of wet butanol. Analytical results were as follows:

*Analytical results for Example 3*

| Phase | Volume, ml. | HMF Found, grams | Yield, Percent of Theory |
|---|---|---|---|
| Butanol after 1st Conversion | 50 | 0.759 | 21.5 |
| Extract from Aqueous Phase, 1st Conversion | 48 | 0.231 | 6.5 |
| Butanol after 2nd Conversion | 53 | 0.396 | 11.2 |
| Extract from Aqueous Phase, 2nd Conversion | 51 | 0.143 | 4.0 |
| Final Aqueous Phase | 49 | 0.094 | 2.7 |

Total HMF recovered in butanol extracts ____ per cent __ 43.2

EXAMPLE 4.—SUCROSE CONVERSIONS WITH VARYING AMOUNTS OF BUTANOL

Mixtures of sucrose, sulfuric acid, dry normal butyl alcohol and water were prepared as follows:

Series A—sucrose, 10 parts; water, 100 parts; butanol, none; sulfuric acid, 0.100 normal in mixture Series B—sucrose, 10 parts; water, 84 parts; butanol, 16 parts; sulfuric acid, 0.100 normal in mixture Series C—sucrose, 10 parts; water, 68 parts; butanol, 32 parts; sulfuric acid, 0.100 normal in mixture Series D—sucrose, 10 parts; water, 52 parts; butanol, 48 parts; sulfuric acid, 0.100 normal in mixture Aliquot portions of these mixtures were converted in small glass tubes at 150° C. for various time periods, namely, 5, 10, 15, 20, 25, and 30 minutes. After conversion the tubes were cooled, opened and the contents diluted for ultraviolet analysis. Results were as follows:

*HMF found—percent of theory*

| Conversion Time (min.) | Series A | Series B | Series C | Series D |
|---|---|---|---|---|
| 5  | 33.7 | 38.7 | 45.3 | 53.7 |
| 10 | 47.8 | 52.5 | 57.8 | 60.1 |
| 15 | 46.3 | 53.0 | 57.1 | 61.1 |
| 20 | 46.1 | 50.9 | 57.8 | 57.5 |
| 25 | 44.5 | 49.1 | 54.0 | 54.2 |
| 30 | 41.0 | 46.8 | 50.9 | 49.6 |

HMF may be considered as an intermediate product in a series of consecutive reactions starting with hexose sugars and ending with levulinic and formic acids. While other intermediates presumably occur in this reaction series, they are so unstable as to have only transitory existence. In addition to this main chain of reactions a branching chain originates with HMF and leads through soluble coloring matters to insoluble humin as an end product. The entire scheme of reactions may be represented as in the following diagram.

*Reactions of HMF formation and destruction*

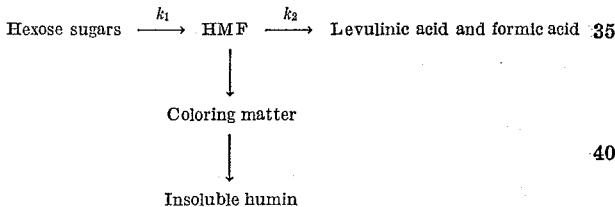

It has been discovered that the rate controlling step in reactions of HMF formation is of pseudo-first order type, i. e. the rate is proportional to the concentration of the primary reactant and to the catalyst concentration. At low sugar concentrations the humification is of negligible importance so that only the main chain of reactions need be considered. Under these conditions the well known kinetics of consecutive first order reactions will apply. It may thus be shown that the maximum yield of the intermediate (HMF) obtainable in a one stage process is dependent on the values of the reaction velocity constants, $k_1$ and $k_2$ and is independent of the concentration of the starting material, $k_1$ being the HMF formation reaction velocity constant, and $k_2$ being the HMF destruction reaction velocity constant. The relationships involved are expressed in the following equations and are illustrated graphically in the accompanying drawing designated Figure 1.

Fraction of sugar as HMF at time $\theta$ (theta) $= \dfrac{k_1}{k_1 - k_2}[e^{-k_2\theta} - e^{-k_1\theta}]$ (1)

Maximum HMF yield (percent) $= 100[k_2/k_1]^{k_2/k_1 - k_2}$ (2)

Time to maximum $= \dfrac{2.3}{k_1 - k_2} \log k_1/k_2$ (3)

Fraction of sugar remaining at time $\theta = e^{-k_1\theta}$ (4)

Fraction of sugar as levulinic and formic acids at time $\theta = 1 - $ Eq. 1 $-$ Eq. 4 (5)

In Figure 1 experimentally determined values of the rate constants for a one percent levulose solution in one-tenth normal sulfuric acid at 130 and 150 degrees centigrade have been used to plot Equations 1 and 4, above at the two temperatures. Curves for 130° C. indicate a maximum yield of HMF based on the sugar originally present of 41.5% at about 100 minutes' reaction time. However, at this time 32% of the sugar still remains so that the yield based on sugar consumed is 61%. At 150° C. the maximum occurs at only 19 minutes and amounts to 51.6% based on original sugar or 68.3% based on sugar consumed. Moreover, if this reaction were to be stopped at 10 minutes instead of 19, the yield of HMF based on sugar consumed would be 83%. It is apparent from a consideration of Fig. 1 that when the reaction rates are increased by higher temperatures the time to the maximum becomes more sharply defined. It is also apparent from Equation 2 and Fig. 1 that if the reaction velocity constant $k_1$ can be increased relative to $k_2$ the maxima for the curves will attain higher values, and this can be accomplished by the use of higher reaction temperatures and by use of an aliphatic monohydric alcohol.

It is desired to point out that Equations 2 and 3 may be solved to obtain the values of the velocity reaction constants $k_1$ and $k_2$ which have to be satisfied in order to attain the desired yield. These are set forth in the following table:

| Yield Desired, Percent | Reaction Time Desired, minutes | $k_1$ | $k_2$ | $k_1/k_2$ |
|---|---|---|---|---|
| 90 | 1   | 3.67   | 0.1046   | 35.1 |
|    | 10  | 0.367  | 0.01046  | 35.1 |
|    | 100 | 0.0367 | 0.001046 | 35.1 |
| 80 | 1   | 2.72   | 0.223    | 12.2 |
|    | 10  | 0.272  | 0.0223   | 12.2 |
|    | 100 | 0.0272 | 0.00223  | 12.2 |
| 70 | 1   | 2.20   | 0.345    | 6.38 |
|    | 10  | 0.220  | 0.0345   | 6.38 |
|    | 100 | 0.0220 | 0.00345  | 6.38 |
| 60 | 1   | 1.74   | 0.511    | 3.33 |
|    | 10  | 0.174  | 0.0511   | 3.33 |
|    | 100 | 0.0174 | 0.00511  | 3.33 |

Referring to the above table, it is to be noted that the ratio of $k_1/k_2$ determines the yield and that the time to the maximum varies inversely with both constants. The ratio of $k_1/k_2$ is slightly less than doubled for a 10% increase in yield between 60 and 80%. However, a much greater increase in the ratio is necessary in order to provide a 80 to 90% yield of HMF. Yields as high as 80% may be obtainable by increasing the temperature to about 200° C., with 225° C. as the top limit. Therefore, a broad range for the ratio of $k_1/k_2$ is from about 1.5 to about 25.0, this covering yields from 50 to 85%. $k_1$ may vary from 0.1 to about 6.0 and $k_2$ from 0.05 to 0.25, or more broadly from 0.01 to about 6.0 and $k_2$ from .0007 to 0.25.

It is desired to point out that previous workers in the field relating to the production of HMF have not been aware that if the ratio $k_1/k_2$ was maintained as herein set forth that the yield of HMF could be increased, and more specifically that the prior investigators did not know that high yields could be obtained if the HMF formation reaction velocity constant $k_1$ was increased relative to the HMF destruction constant $k_2$. It has been discovered that the HMF formation reaction constant increases more rapidly with increasing temperature than does the velocity of the HMF destruction reaction constant. This effect is shown graphically in Fig. 1.

It is desired to point out that the beneficial effect of the alcohols used in carrying out the present invention may vary with the concentration of the alcohol in aqueous solution. It appears that the molar ratio of the alcohol is an important factor and that this molar ratio may vary between the limits of 0.1 and 0.4, and for preferred results the molar ratio of alcohol to water should be about 0.3. In Example 4 results with 48% normal butyl alcohol were only slightly better than with 32%. The rate of HMF formation begins to slow up when 60% butanol is used. The above indicates that beneficial results from the use of alcohols occur over a wide range but that at certain concentrations better yields are obtained. When normal butyl alcohol is used in a reaction medium to modify the reaction rates $k_1 k_2$ other useful effects are obtained. Since normal butyl alcohol and water are not miscible at temperatures below 125° C., the reaction mixture separates into two phases on cooling, the lighter alcohol-rich phase being found to contain a large portion of HMF and almost all of the coloring matter and humin. The latter is soluble in a wet butyl alcohol so that no solid matter is formed. In the presence of an acid catalyst, such as sulfuric acid, the phase separation is sharp and rapid and well suited to decantation procedures. Sugars and dilute mineral acid are largely retained in the aqueous phase, while formic and levulinic acids are more butanol soluble. It has been ascertained that the presence of sugar increases the partition coefficient of HMF between butanol and water and thereby improves the efficiency of the extraction process. Some comparative partition coefficients for HMF between various solvents and water are shown in the following table:

*Partition coefficients for HMF*

| | |
|---|---|
| Normal butyl alcohol—water | 1.57 |
| Normal butyl alcohol—10% sucrose soln | 1.69 |
| Normal butyl alcohol—20% sucrose soln | 1,76 |
| Ethyl acetate—water | 1.46 |
| Normal amyl alcohol—water | 1.09 |
| Secondary amyl alcohol—water | 1.25 |
| Tertiary amyl alcohol—water | 1.63 |

As pointed out, while alcohols miscible with water may be used in carrying out the present invention, it is preferred to use alcohol which is immiscible with water at room temperature and provides an initial extraction product. The aqueous phase after further extraction may be recycled, that is, returned to the conversion process. The alcohol phase, combined with further HMF alcohol extract solutions may be treated in a variety of ways for HMF purification and recovery. For example, it may be back-washed with alkali solutions to neutralize acids and remove their salts and residual sugars. This may be accomplished with little loss of HMF in a continuous multistage extraction apparatus. The purified alcohol solution of HMF may then be dried and concentrated by distillation of water and alcohol at reduced pressure. The HMF sirup may be crystallized at low temperature or distilled in a vacuum or redissolved in water for further use.

Levulose is a desirable sugar for carrying out the process, but it is not available commercially at a reasonable price. Inulin from Jerusalem artichoke tubers or chicory is equivalent to levulose. The crude juices from the minced tubers may be used. Sucrose has a high aldohexose content and, therefore, when recycling method is employed as hereinafter set forth in detail, there is a large build-up of the aldo-hexose content unless the aldohexoses are eliminated from the system.

The important factor in the sugar concentration is the amount of keto-hexose content since the aldo-hexoses are only slightly attacked in the conversion process.

Black-strap molasses can be used and Example 3 is based on its use. This illustrates it is not necessary to use pure refined sugar. The molasses does not give as high a yield as sucrose and is difficult to handle, but since it is an easily available economic raw material, it may be used in carrying out the present invention.

All the yields herein set forth are expressed as moles of HMF per mole of keto-hexose in the raw material. There is a minor error in so expressing the yield when the HMF is produced from sucrose since a small amount of HMF must also come from the glucose half of the sucrose molecule. However, the error is so small as to be negligible.

It has been previously pointed out that any prior art catalyst including acid catalysts and acid-generated catalysts may be employed in carrying out the present invention. The following catalysts are set forth as illustrative:

| | |
|---|---|
| Hydrochloric acid | Zinc chloride |
| Hydrobromic acid | Aluminum chloride |
| Phosphoric acid | |
| Sulfuric acid | |

Phosphoric acid forms very little humin during the conversion reaction, but is less active than sulfuric acid so higher concentrations of phosphoric acid are desirable as compared to sulfuric acid when the conversion reaction times are about the same.

It has been stated that in one form of the invention it is desirable to stop the conversion reaction prior to obtaining maximum peak yield of HMF based on the amount of sugar originally present in the reaction medium. This yield may be termed "max.$^{sp}$." The maximum yield is the peak yield which may be obtained under a given set of reaction conditions, as set forth in curve C of Fig. 1. Its value is determined by the ratio $k_1/k_2$ as hereinbefore set forth. In general, it may be stated that it is desirable to stop the reaction when the yield is one-half to two-thirds of the maximum yield produced. In other words, all conditions of the conversion reaction are the same except the time of duration of the reaction. The sooner the reaction is stopped, the higher the HMF yield is based on the sugar consumed but the amount of HMF produced per unit of material processed will be reduced. For example, if the peak HMF yield or concentration of about 65% is obtained at 160° C., the reaction could be stopped when the yield of HMF is about 35%. Various pressures may be utilized in carrying out the conversion reaction. The pressures used are preferably the equilibrium vapor pressures for the reaction mixtures at the reaction temperature. These pressures in general are roughly equal to saturated steam pressures at the same temperatures, lowered perhaps just a little by the dissolved sugar. If methanol or ethanol or other high volatile alcohols are used instead of butanol, which is not as volatile as methanol or ethanol, then the pressures may be 10 to 15 pounds more, or even greater than the saturated steam pressures for the same temperatures.

While the aqueous solution or the aqueous alcoholic solution having present the keto-hexose sugar may vary in concentration, the preferred limits of sugar concentration are between about 2.5% and 20 or 25%; that is, the reaction solution should contain from 2.5% to 20 or 25% by weight of the sugar. For example, a mixture may be formed of 15 parts of sucrose, 55 parts of water, and 35 parts of dry butanol, all taken by weight. This mixture is completely miscible at 150° C. When the amount of sugar in the above mixture is increased from 15 parts to 20 parts, the butanol is not completely miscible at 150° C. However, the invention may be carried out by using water-soluble alcohols, that is, alcohols of greater solubility in water. Moreover, the invention is not limited in its broad aspects as previously pointed out to the use of an alcohol which is miscible at the reaction temperature. The reaction process for the production of HMF may be carried out with two immiscible phases in the converter and a high degree of dispersion may be achieved through agitation, or the process may be operated with continuous removal of the alcohol phase.

A flow sheet for one embodiment of the process is shown in Figure 2. Sucrose, dilute sulfuric acid, levulose-enriched raffinate and normal butyl alcohol are mixed and charged to a converter 1 which may be of batch or continuous flow type. Therein the mixture is heat reacted at a temperature between 130 and 225° C. for a time sufficient under chosen conditions to convert a portion of the levulose to HMF but insufficient to reach "max.$^{sp}$." The converted liquor is cooled by means of a heat exchanger 2 and is separated into alcohol-rich and aqueous phases in a decanter 3. The alcohol-rich phase from the decanter 3, containing most of the HMF, coloring matter, and organic acids, is combined with the extract from the extractor 6 and is purified in a continuous, counter-current scrubber 4 using dilute sodium hydroxide solution and a bottom reflux of butanol. The purified butanol solution of HMF is concentrated to a sirup in a vacuum still 5. The aqueous phase from the decanter 3 is further extracted in a continuous, counter-current extractor 6 the raffinate from which is concentrated in an evaporator 7 and glucose is removed in a crystallizer 8. The levulose-enriched raffinate is recharged to the converter 1 with new raw material. Butanol and water from the still 5 are reused in the process.

What is claimed is:

1. In the method of producing 5-hydroxymethyl 2-furfural by heat-reacting under pressure in the presence of an acidic catalyst and between the temperature limits of about 130° C. and about 225° C. an aqueous solution of a keto-hexose sugar, said catalyst being stable at the temperature at which the sugar solution is reacted, the step of accelerating the rate of formation of the 5-hydroxymethyl 2-furfural relative to the rate of its decomposition by having present in said aqueous solution an unsubstituted, saturated aliphatic monohydric alcohol having from 1 to 5 carbon atoms in its molecule, the molar ratio of the alcohol to the water in said solution being between the limits of 0.1 and 0.4.

2. In the method of producing 5-hydroxymethyl 2-furfural by heat-reacting under pressure in the presence of a catalyst and between the temperature limits of about 130° C. and about 225° C. an aqueous solution of a keto-hexose sugar, said catalyst being selected from the group of catalysts consisting of hydrochloric acid, hydrobromic acid, phosphoric acid, sulfuric acid, zinc chloride and aluminum chloride, the step of accelerating the rate of formation of the 5-hydroxymethyl 2-furfural relative to the rate of its decomposition by having present in said aqueous solution an unsubstituted, saturated aliphatic monohydric alcohol having from 1 to 5 carbon atoms in its molecule, the molar ratio of the alcohol to the water in said solution being between the limits of 0.1 and 0.4.

3. In the method of producing 5-hydroxymethyl 2-furfural by heat-reacting under pressure in the presence of a catalyst and between the temperature limits of about 130° C. and about 225° C. an aqueous solution of a keto-hexose sugar, said catalyst being selected from the group of catalysts consisting of hydrochloric acid, hydrobromic acid, phosphoric acid, sulfuric acid, zinc chloride and aluminum chloride, the step of accelerating the rate of formation of the 5-hydroxymethyl 2-furfural relative to the rate of its decomposition by having present in said aqueous solution an unsubstituted, saturated aliphatic monohydric alcohol miscible with water at the reaction temperature, said alcohol having from 1 to 5 carbon atoms in its molecule, but immiscible with water at a temperature between the limits of about 25° C. and about 40° C., the molar ratio of the alcohol to the water in said solution being between the limits of 0.1 and 0.4.

4. In the method of producing 5-hydroxymethyl 2-furfural by heat-reacting under pressure in the presence of a catalyst and between the temperature limits of about 130° C. and about 225° C. an aqueous solution of a keto-hexose sugar, said catalyst being selected from the group of catalysts consisting of hydrochloric acid, hydrobromic acid, phosphoric acid, sulfuric acid, zinc chloride and aluminum chloride, the step of accelerating the rate of formation of 5-hydroxymethyl 2-furfural relative to the rate of its decomposition by having butanol present in said aqueous solution, the molar ratio of the butanol to the water in said solution being between the limits of 0.1 and 0.4.

5. The method defined in claim 1 in which the catalyst is a strong mineral catalyst.

6. The method defined in claim 2 in which there is present in solution a strong mineral acid catalyst having a concentration between the limits of about 0.02 normal and 0.2 normal.

7. The method defined in claim 3 in which there is present in solution a strong mineral acid catalyst having a concentration between the limits of about 0.02 normal and 0.2 normal.

8. The method of producing 5-hydroxymethyl 2-furfural comprising forming a mixture of an aqueous alcoholic solution of a keto-hexose sugar having a sugar concentration between the limits of about 2.5% and about 20%, and a catalyst selected from the group of catalysts consisting of hydrochloric acid, hydrobromic acid, phosphoric acid, sulfuric acid, zinc chloride and aluminum chloride, said catalyst accelerating the formation of the keto sugar into 5-hydroxymethyl 2-furfural, said aqueous alcohol solution comprising water and an unsubstituted, saturated aliphatic monohydric alcohol having from 1 to 5 carbon atoms in its molecule, said alcohol functioning to increase the rate of formation of the 5-hydroxymethyl 2-furfural at the reaction temperature, and reacting the resulting mixture at a temperature between the limits of about 130° C. and about 225° C., the molar ratio of the alcohol to the water in said solution being between the limits of 0.1 and 0.4.

9. The method of producing 5-hydroxymethyl 2-furfural comprising forming a mixture of an aqueous alcoholic solution of a keto-hexose sugar having a sugar concentration between the limits of about 2.5% and about 20%, and a catalyst selected from the group of catalysts consisting of hydrochloric acid, hydrobromic acid, phosphoric acid, sulfuric acid, zinc chloride and aluminum chloride, said catalyst accelerating the formation of the keto sugar into 5-hydroxymethyl 2-furfural, said catalyst being present in solution in a concentration between the limits of about 0.02 and about 0.2 normal, said aqueous alcohol solution comprising water and an unsubstituted, saturated aliphatic monohydric alcohol having from 1 to 5 carbon atoms in its molecule, said alcohol functioning to increase the rate of formation of the 5-hydroxymethyl 2-furfural at the reaction temperature, the water being present in a predominating proportion, said alcohol being miscible with the water at the reaction temperature, and reacting said mixture at a temperature between the limits of about 130° C. and about 225° C., the molar ratio of the alcohol to the water in said solution being between the limits of 0.1 and 0.4.

10. The method defined in claim 1 in which the catalyst is sulphuric acid.

11. In the method of producing 5-hydroxymethyl 2-furfural comprising heat-reacting under pressure and between the temperature limits of about 130° C. and about 225° C. an aqueous solution of a keto-hexose sugar, the step of accelerating the rate of formation of the 5-hydroxymethyl 2-furfural relative to the rate of its decomposition by having present in said aqueous solution an unsubstituted, saturated aliphatic monohydric alcohol having from 1 to 5 carbon atoms in its molecule, the molar ratio of the alcohol to the water in said solution being between the limits of 0.1 and 0.4.

References Cited in the file of this patent

UNITED STATES PATENTS

| | | |
|---|---|---|
| 2,498,918 | Haworth et al. | Feb. 28, 1950 |

FOREIGN PATENTS

| | | |
|---|---|---|
| 591,858 | Great Britain | Sept. 1, 1947 |
| 600,871 | Great Britain | Apr. 21, 1948 |

OTHER REFERENCES

"Handbook of Chem. and Physics," 24th ed., p. 818, No. 4057 (1940).

Haworth et al.: Chem. Soc. Jour. (1944), part I, pp. 667–670.